United States Patent
Arens et al.

[15] 3,676,653
[45] July 11, 1972

[54] MEASUREMENT OF HEAT GENERATED IN EXOTHERMIC REACTION

[72] Inventors: James L. Arens; Hi W. Staten, both of Bartlesville, Okla.

[73] Assignee: Phillips Petroleum Company

[22] Filed: Aug. 28, 1970

[21] Appl. No.: 67,942

[52] U.S. Cl. ..................235/151.3, 23/230 R, 235/151.12
[51] Int. Cl. .........................................................G06g 7/58
[58] Field of Search ............235/151, 151.12, 151.3, 151.34, 235/193–194; 73/190–193, 204, 339–340, 344, 357, 362.8; 202/160; 196/132; 23/230; 62/37; 203/1–3

[56] References Cited

UNITED STATES PATENTS

| | | |
|---|---|---|
| 3,220,998 | 11/1965 | Berger..........................235/151.12 UX |
| 3,275,809 | 9/1966 | Tolin et al..........................235/151.12 |
| 3,232,069 | 2/1966 | Hawkins............................73/190 R X |
| 3,351,430 | 11/1967 | Amrehn et al. ................235/151.12 X |
| 3,470,069 | 9/1969 | Bracken et al............................203/2 |
| 3,297,412 | 1/1967 | Phillips, Jr. et al................196/132 X |
| 3,492,283 | 1/1970 | Miller...............................23/230 A X |

Primary Examiner—Eugene G. Botz
Assistant Examiner—Jerry Smith
Attorney—Young and Quigg

[57] ABSTRACT

A batch reactor is controlled by measuring heat transfer from the reactor and integrating the measured signal. The computation is based on the flow of coolant and measured temperatures. When the integrated signal reaches a preselected value, the reaction is terminated. The integrated signal can also be used to control introduction of a reactant.

10 Claims, 2 Drawing Figures

INVENTORS
J.L. ARENS
H.W. STATEN

BY Young & Quigg
ATTORNEYS

MEASUREMENT OF HEAT GENERATED IN EXOTHERMIC REACTION

It is common practice in the chemical industry to carry out various chemical reactions in batch reactors. In order to obtain maximum production of specification product, it is usually necessary to control quite accurately both the rate of addition of reactants and the termination time of the reaction. While automatic control can be based on a predetermined timed sequence, process variations cannot readily be corrected by this procedure. Another possible control method involves periodic removal of samples from the reactor for analysis. However, certain reactants cannot be analyzed rapidly so that control systems based on analyses are not always practical.

In accordance with one embodiment of the present invention, apparatus is provided which is capable of determining automatically the rate at which a chemical reaction takes place and the time at which the reaction is completed. This determination is based on a calculation of the rate at which heat is liberated in the exothermic reaction. The heat transfer is calculated from measurements of the rate of flow of a fluid passed in heat exchange relationship with the reactor and the temperature differential of the heat exchange fluid upon entering and leaving the reactor. In addition, compensation is made for the heat content of the reactor and its contents. From these measurements and calculations, an integrated signal is obtained which represents the cumulative heat change in the reactor, which is indicative of the degree of completion of the reaction. This signal can be differentiated to provide a control signal which is independent of minor fluctuations in the heat exchange rate. In response to these signals, the reactor can be controlled by adjusting the rate of addition of one or more reactants, and the reaction can be terminated at the proper time.

In the accompanying drawing.

In order to describe the computer and control system of this invention, reference will be made to a particular reaction for the production of polyphenylene sulfide. This polymer can be produced by reacting dichlorobenzene with sodium monosulfide monohydrate in a batch reactor. The reaction is exothermic with a heat of reaction of approximately 1,200 Btu's per pound of polymer produced.

Figure 1:
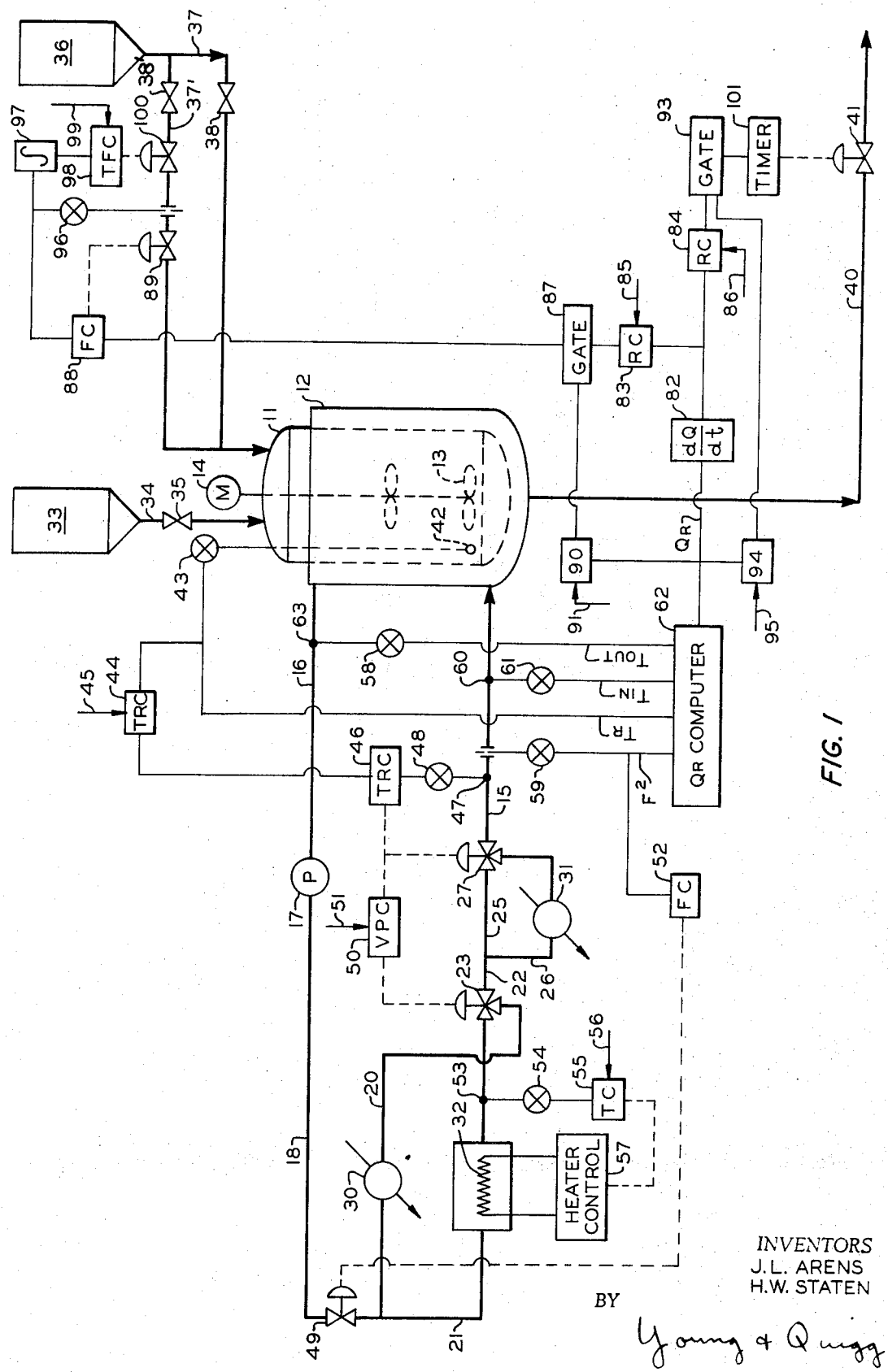
FIG. 1 is a schematic representation of an embodiment of the control system of this invention.

Referring now to the drawing in detail, and to FIG. 1 in particular, there is shown a reactor 11 which is provided with a jacket 12 through which a heat exchange medium can be circulated. Reactor 11 is provided with agitation means such as a stirrer 13 which is rotated by a motor 14. A heat exchange medium is introduced into jacket 12 through a conduit 15 and is removed through a conduit 16. The heat exchange medium is directed by a pump 17 from conduit 16 through a conduit 18 which is connected to parallel conduits 20 and 21, the latter joining a conduit 22 at a valve 23. Parallel conduits 25 and 26 connect conduit 22 to inlet conduit 15 at a valve 27. Heat exchange medium can thus be circulated in a closed loop which includes jacket 12.

Cooling means 30 and 31 are disposed in respective conduits 20 and 26, and a heater 32 is disposed in conduit 21. The temperature of the heat exchange medium introduced into jacket 12 can thus be regulated by manipulation of valves 23 and 27 to control the relative flows through the cooling and heating means.

Dichlorobenzene is introduced into reactor 11 from a storage vessel 33 which is connected to the reactor by a conduit 34 that has a valve 35 therein. Partially hydrated sodium monosulfide plus a solvent, such as N-methyl-2-pyrrolidone, are introduced into reactor 11 from a storage vessel 36 which is connected to the reactor by a conduit 37 that has a valve 38 therein. At the beginning of a reaction cycle, valves 35 and 38 are opened to introduce predetermined quantities of the reactants. Product can be removed from reactor 11 through an outlet conduit 40 which has a valve 41 therein.

A first temperature sensing element 42 is positioned within reactor 11 to measure the temperature of the reaction medium. This sensing element is connected to a transducer 43 which transmits a signal representative of the measured temperature to a temperature controller 44. A set point signal 45, representative of the desired reaction temperature, is also applied to the temperature controller. The output signal from controller 44, which is representative of any difference between the measured signal and the set point signal, is transmitted as a set point signal to a second temperature controller 46. A second temperature sensing element 47 is positioned to measure the temperature of fluid in conduit 15. This sensing element is connected to a transducer 48 which transmits a signal representative of the measured temperature to controller 46. The output signal from controller 46, which is representative of the difference between the two input signals, is applied to valve 27 to adjust the relative flows through conduits 25 and 26. The output signal from controller 46 is also applied as the input signal to a valve position controller 50. Controller 50 receives a set point signal 51. The output signal from controller 50, which is representative of the difference between the two input signals, is applied to valve 23 to control the relative flows through conduits 20 and 21. The flow of heat exchange medium through the closed loop is maintained at a predetermined rate by a flow controller 52 which adjusts a valve 49 in conduit 18 in response to a signal from a transducer 59 which senses the rate of flow through conduit 15.

As previously mentioned, the production of polyphenylene sulfide is an exothermic reaction. However, it is necessary to elevate the temperature of the reactants to at least 400° F before the reaction will commence. At the beginning of the cycle, the reactants are normally introduced into reactor 11 at temperatures somewhat below 350° F. In order to start the reaction, warm heat exchange medium is circulated through jacket 12. At this time, the signal transmitted by transducer 43 is representative of a relatively low temperature within the reactor. The output signal from controller 46 is such that valves 23 and 27 are positioned so that all or at least a major portion of the heat exchange medium flows through heater 32. This serves to elevate the temperature of the reactor and start the reaction. As the reaction temperature builds up, it is necessary to convert from heating the reactor to cooling the reactor in order to control the exothermic reaction. As the measured temperature within the reactor increases, the set point to controller 46 changes so that valves 23 and 27 are adjusted to direct more of the heat exchange medium through coolers 30 and 31. In this manner, the temperature of the reactor can be maintained at a desired set point value during the reaction period, which may be of the order of several hours. The reaction is advantageously carried out at a temperature of approximately 475° F.

A temperature sensing element 53 is disposed in conduit 21 downstream of heater 32 to measure the temperature of the heat exchange medium. This sensing element is connected to a transducer 54 which transmits a signal representative of the measured temperature to a temperature controller 55 that receives a set point signal 56. Controller 55 regulates a suitable heater control 57 in order to prevent overheating of the exchange medium, particularly during any time that there is a low flow through conduit 21.

In order to measure the rate of polymer production and to determine the time at which the reaction is completed, signals are established which are representative of the temperatures of the heat exchange medium flowing into and out of reactor 11 and the rate of flow of this heat exchange medium. To this end, a temperature sensing element 60 is positioned in conduit 15 adjacent jacket 12. This sensing element is connected to a transducer 61 which transmits a signal $T_{IN}$ representative of the measured temperature to a $Q_R$ computer 62. Similarly, a temperature sensing element 63 is positioned in conduit 16 adjacent jacket 12. This sensing element is connected to a transducer 58 which transmits a signal $T_{OUT}$, which is representative of the measured temperature, to computer 62. An output signal $T_R$ from transducer 43 and an output signal $F^2$ from transducer 59 are also transmitted to computer 62.

Figure 2:
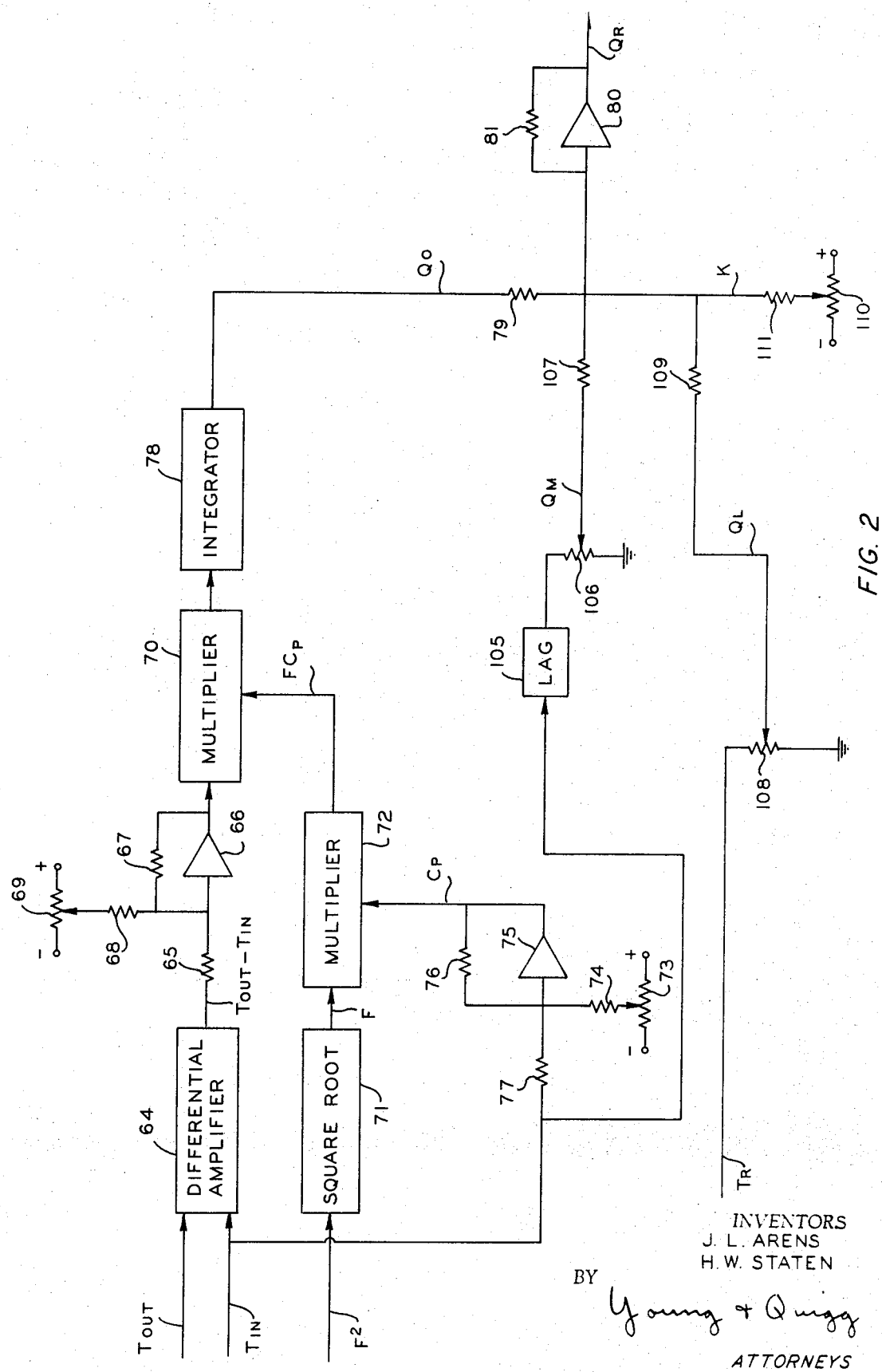
FIG. 2 illustrates the $Q_R$ computer of FIG. 1.

Computer 62, which is illustrated in detail in FIG. 2, solves the following basic equation:

$$Q_R = Q_O + Q_M + Q_L + K \qquad (1)$$

where $Q_O$ is the heat removed from the reactor by the circulating fluid (such as a hydrocarbon oil) passed through jacket 12, $Q_M$ is the heat accumulated by the reactor, $Q_L$ is the heat accumulated by the material within the reactor, $K$ is a constant which relates to the initial temperature, and $Q_R$ is the total heat of reaction which is released. The quantity $Q_O$ is represented by the following equation:

$$Q_0 = \int_0^t FC_p (T_{\text{out}} - T_{\text{in}}) dt \qquad (2)$$

where $F$ is the rate at which the heat exchange medium is circulated through jacket 14, $C_p$ is the specific heat of the circulating oil, $T_{OUT}$ is the temperature of the heat exchange medium leaving jacket 12, and $T_{IN}$ is the temperature of the heat exchange medium entering the jacket.

If it were possible to design a reaction system so that there would be no heat loss, heat gain or heat accumulation within the system due to temperature change within the reaction time period, $Q_O$, as calculated above, would be zero except when the polymerization reaction is taking place. However, this is not possible in any practical system, so that compensation must be made to balance out such factors as heat loss, heat added by the stirring motor, temperature changes, and errors in the measuring system. Any fluctuation in the rate of flow of heat exchange medium could also create a temperature differential. However, this flow is maintained substantially constant by means of flow controller 52. Compensation is made in the computer of FIG. 2 for the other variables. The temperature of the reactor changes by an amount such that appreciable error could occur if temperature correction for changes in the specific heat and specific gravity of the circulating oil were not made. However, these corrections can be combined in one network by appropriate curve fitting. Such a curve can be prepared by plotting heat removal capacity (Btu/minute/°F) versus heat exchange medium temperature to the jacket. As the temperature of the heat exchange medium changes, the heat removal capacity changes because the specific gravity of the medium changes as does the specific heat.

As the reactor temperature builds up above some initial starting point, heat is accumulated in the reactor walls and in the walls of the jacket. The circulating heat exchange medium does not remove this heat so that it is treated as additional heat derived from the reaction. In the design of the computer of FIG. 2 it is assumed that the walls of the reactor and the heat exchange jacket will assume the same temperature as the temperature of the incoming heat exchange medium. While this is approximately correct under steady state conditions, an error is introduced if the temperature of the heat exchange medium changes rapidly. Because of the time required for the reactor walls to change temperature, a time delay, which can be a first order lag, is employed in the oil temperature correction for $Q_M$.

As the reactor temperature increases, heat is accumulated in the reactor contents as well as in the walls of the reactor. However, it is assumed that the temperature of the reactants is the same as the measured temperature $T_R$ so that no time delay is required. The amount of correction employed to compensate for the quantity $Q_L$ depends on the amount of material within the reactor and the average specific heat of this material.

An initial condition constant $K$ is employed to balance out the effect of $Q_M$ and $Q_L$ at the start of each reaction. Otherwise $Q_R$ would be in error unless the computer were started with the reactor and the circulating heat exchange fluid at the same temperature for each operation.

As illustrated in FIG. 2, input temperature signals $T_{OUT}$ and $T_{IN}$ are applied to a differential amplifier 64 which provides an output signal representative of the measured temperature differential. This output signal is applied through an input resistor 65 to a summing amplifier 66 which is provided with a feedback resistor 67. A reference potential is applied to the input of amplifier 66 through an input resistor 68. This reference potential is obtained from the contactor of potentiometer 69 which has a voltage source applied across the end terminals thereof. The position of the contactor of potentiometer 69 is adjusted to provide the necessary correction for heat imparted by the mixer and heat loss from the reactor. This factor may be either positive or negative in a given system. The output of amplifier 66 is applied to the first input of a signal multiplier 70. The output signal from flow transducer 54 of FIG. 1 is applied as input signal $F^2$ to a square root device 71. Since the differential pressure across an orifice is proportional to the square of the rate of flow through the orifice, it is necessary to take the square root of the measured pressure differential to obtain a signal that is directly proportional to flow. The output signal $F$ from square root device 71 is applied to the first input of a second multiplier 72. The second input signal $C_p$ to multiplier 72 is representative of the specific heat of the heat exchange medium. This signal is obtained from a potentiometer 73 which has a voltage source applied across the end terminals thereof. The contactor of potentiometer 73 is connected by an input resistor 74 to the input of a summing amplifier 75 which has a feedback resistor 76. Since the specific heat of the heat exchange medium is a function of the temperature of the medium, appropriate compensation is made by applying the measured temperature $T_{IN}$ to the input of amplifier 75 through a resistor 77. The output signal $FC_P$ from multiplier 72 is applied to the second input of multiplier 70. The output signal from multiplier 70 is applied through an integrator 78 to obtain a signal representative of $Q_O$. This signal is applied through a first input resistor 79 to a summing amplifier 80 which is provided with a feedback resistor 81. Integrator 78 is started at the beginning of the reaction.

The temperature signal $T_{IN}$ is applied through a lag device 105, which can be a first order lag, to a potentiometer 106. The contactor of potentiometer 106 is adjusted to multiply by a value representative of the specific heat of the reactor. The signal $Q_M$ at the contactor of potentiometer 106 is applied through a second input resistor 107 to summing amplifier 80. Input signal $T_R$ is applied across a potentiometer 108 which multiplies by a value representative of the specific heat of the reactants to obtain a signal representative of the quantity $Q_L$. This signal is applied through a third input resistor 109 to summing amplifier 80. A potentiometer 110 is connected across a voltage source to provide a signal representative of $K$. This signal is applied through a fourth input resistor 111 to amplifier 80. While the reactor is being heated and before a reaction actually takes place, integrator 78 is reset and the contactor of potentiometer 110 is adjusted to obtain a zero output from amplifier 80. This operation is performed at the beginning of each cycle of the reaction and thereby establishes an appropriate value $K$.

As illustrated in FIG. 1, the output signal $Q_R$ from computer 62 is applied to the input of a differentiating means 82 which establishes an output signal $dQ/dt$ that represents the derivative of the integrated signal with respect to time. This signal is transmitted to the inputs of respective controllers 83 and 84. Controllers 83 and 84 are provided with respective set points 85 and 86. The output signal of controller 83, which is representative of the difference between the two input signals to the controller, is applied to a gate 87. When the gate is open, the signal from controller 83 is transmitted to a flow controller 88 which adjusts a valve 89 in a conduit 37'. Conduit 37' extends from vessel 36 to the inlet of reactor 11. The output signal $Q_R$ from computer 62 is also transmitted to a controller 90 which acts in an "on-off" manner. Controller 90, which receives a set point signal 91, establishes an output signal which opens gate 87 when a predetermined relationship exists between the two input signals to controller 90, as described hereinafter in greater detail. In a similar fashion, the output signal from controller 84 is applied to a timer 101. In a reaction cycle, after a preset time has expired, the signal to timer 101 is applied through a gate 93 to control valve 41. This signal can also sound an alarm to alert an operator. Gate 93 is controlled by an "on-off" controller 94 which is similar to controller 90. Controller 94 receives signal $Q_R$ and a set point signal 95 representative of the achievement of a desired degree of batch reaction, following which termination of the reaction based upon the rate of heat release, $dQ/dt$, is proper.

As previously mentioned, reactant initially is supplied from vessel 36 through conduit 37. This is accomplished by opening valve 38 for a predetermined period. Thereafter, valve 38 is closed. However, additional reactant can subsequently be supplied through conduit 37' at a maximum rate determined by valve or flow restrictor 38'. At the beginning of the reaction, integrator 78 of FIG. 2 is placed in operation to compute the cumulative exothermic heat of reaction. Initially, heat is supplied to the reactor so that there is a negative, or zero, signal to the integrator. At the beginning of the reaction period, gate 87 is closed so that there is no signal transmitted to flow controller 88. Valve 89 remains closed at this time. The nature of the reaction is such that the polymer production can be increased by adding additional reactant from vessel 36. This addition is controlled by the output signal from differentiating means 82 which is applied through controller 83, in accordance with set point 85, and gate 87 to controller 88. The second input signal to controller 88 is from a flow transducer 96. The set point 91 of controller 90 is such that gate 87 is permitted to open only after the reaction has progressed by a preselected amount, as indicated by the output signal $Q_R$ from computer 62. This prevents premature addition of additional reactant.

It is normally desirable to limit the amount of reactant supplied from vessel 36 during the course of a single reaction. This is accomplished by flow transducer 96 transmitting a signal through an integrator 97 to a total flow controller 98 which receives a set point signal 99. Controller 98 serves to close valve 100 at the time in a reaction cycle when the total flow through conduit 37' reaches a predetermined amount, as measured by the output signal from integrator 97.

At the beginning of the reaction cycle, the signal $dQ/dt$ is relatively low. However, gate 93 is closed because the signal $Q_R$ is not sufficiently high to permit controller 94 to open the gate. As the reaction proceeds, $dQ/dt$ increases. During this time the signal $Q_R$ increases to a sufficiently high value to open gate 93. When $dQ/dt$ falls as the reaction nears completion, a signal is passed through controller 84 (which operates on a low value input signal) to start timer 101. After a preset time interval timer 101 opens valve 41 to empty the reactor.

As a specific example of the control system of this invention, 4910 pounds of dichlorobenzene at about 385° F are introduced into reactor 11 from vessel 33. Then 3,160 pounds of $Na_2S \cdot 1.5H_2O$ are introduced from vessel 36, together with 9,960 pounds of N-methyl-2-pyrrolidone. These materials are at an initial temperature of about 385° F. Hot oil is circulated through jacket 12 to elevate the temperature of the reactants. The reaction starts when the temperature reaches 420° F. The temperature of the reaction medium is permitted to rise until a temperature of about 475° F is reached. This normally takes some 1 to 3 hours. It is desirable to reach 475° F as soon as possible, while still maintaining sufficient control to prevent a runaway. The temperature of the heat exchange medium is regulated by the illustrated control system to maintain a reaction temperature of 475° F. After reaching 475° F, the reaction is permitted to proceed for about 4 hours at this temperature. During this 4 hour period, an additional 260 pounds of the $Na_2S \cdot 1.5H_2O$ are added at a uniform rate through conduit 37'. At the end of the 4 hour period, valve 41 is opened to dump the reactor.

While the invention has been described in conjunction with the production of polyphenylene sulfide for purposes of illustration, it is not limited to this reaction. In some control systems, the flow of more than one reactant can be adjusted by the computed production rate signal. In some systems, timer 101 can be eliminated and the control of reaction completion can be initiated when the signal $dQ/dt$ falls below a preselected set point value. Thus, while the invention has been described in conjunction with a presently preferred embodiment, it obviously is not limited thereto.

What is claimed is:

1. In a batch system which includes a reactor having a heat exchanger associated therewith through which a heat exchange medium is circulated, apparatus for calculating the heat of reaction released by an exothermic reaction taking place within the reactor, comprising:
   means to measure the temperature of heat exchange medium introduced into said heat exchanger and establish a signal $T_{IN}$ representative thereof;
   means to measure the temperature of the heat exchange medium withdrawn from the reactor and establish a signal $T_{OUT}$ representative thereof;
   means to subtract said signal $T_{IN}$ from said signal $T_{OUT}$ to establish a difference signal;
   means to measure the rate of flow of the heat exchange medium through said heat exchanger and establish a signal $F$ representative thereof;
   means to establish a signal $C_p$ representative of the specific heat of the heat exchange medium;
   means to multiply said difference signal by said signal $F$ and by said signal $C_p$ to establish a first product signal;
   means to integrate said first product signal with respect to time to establish a signal $Q_o$ which is representative of heat removed from the reactor by the heat exchange medium;
   means responsive to said measured temperature of the heat exchange medium introduced into the heat exchanger to establish a signal $Q_M$ representative of heat accumulated by the reactor;
   means to measure the temperature of material within the reactor and to establish in response thereto a signal $Q_L$ representative of the heat accumulated by material within the reactor;
   and means to sum said signals $Q_o$, $Q_M$ and $Q_L$.

2. The apparatus of claim 1, further comprising means to establish a signal $K$ representative of the initial conditions of the reaction system at the time the integration of the first product signal is started, and means to add said signal $K$ to the sum of said signals $Q_o$, $Q_M$ and $Q_L$.

3. The apparatus of claim 1, further comprising means to establish a reference signal representative of heat introduced into the reactor by agitation of the contents thereof and heat loss through the walls of the reactor, and means to add said reference signal to said difference signal before said difference signal is multiplied by said signal $F$ and said signal $C_p$.

4. The apparatus of claim 1 wherein said means to establish said signal $C_p$ comprises means to establish a signal of preselected magnitude representative of the specific heat of the heat exchange medium introduced into the reactor, and means to modify said signal of preselected magnitude in response to the measured temperature of the heat exchange medium introduced into the heat exchanger to compensate for changes in specific heat of the heat exchange medium as the temperature of the heat exchange medium changes.

5. The apparatus of claim 1 wherein said means to establish said signal $Q_M$ comprises a signal lagging means, means to apply said signal $T_{IN}$ to the input of said signal lagging means, and means to adjust the amplitude of the output signal from the signal lagging means in accordance with the specific heat of the material of which the reactor is constructed.

6. The apparatus of claim 1 wherein said means to establish said signal $Q_L$ includes means to adjust the amplitude of the signal representative of the measured temperature of the material within the reactor by a factor representative of the specific heat of such material.

7. The apparatus of claim 1, further comprising means to establish a signal Q representative of the sum of $Q_O$, $Q_M$ and $Q_L$, means to differentiate said signal Q with respect to time and to establish a signal $dQ/dt$ representative thereof, and means responsive to said signal $dQ/dt$ to terminate the reaction when said signal $dQ/dt$ falls to a preselected value.

8. In a process in which an exothermic reaction is carried out in a batch reactor and a heat exchange medium is passed in heat exchange relationship with the reactor, a method of calculating the heat of reaction released by the exothermic reaction, comprising:
measuring the temperature of heat exchange medium introduced into heat exchange relationship with the reactor and establishing a signal $T_{IN}$ representative thereof, measuring the temperature of the heat exchange medium withdrawn from heat exchange relationship with the reactor and establishing a signal $T_{OUT}$ representative thereof, subtracting said signal $T_{IN}$ from said signal $T_{OUT}$ and establishing a difference signal representative of the difference;
measuring the rate of flow of heat exchange medium in heat exchange relationship with the reactor and establishing a signal $F$ representative thereof;
establishing a signal $C_p$ representative of the specific heat of the heat exchange medium;
multiplying said difference signal by said signal $F$ and by said signal $C_p$ to establish a first product signal;
integrating said first product signal with respect to time to establish a signal $Q_O$ which is representative of heat removed from the reactor by the heat exchange medium;
establishing in response to the measured temperature of the heat exchange medium introduced into heat exchange relationship with the reactor a signal $Q_M$ which is representative of heat accumulated by the reactor;
measuring the temperature of material within the reactor and establishing in response thereto a signal $Q_L$ representative of the heat accumulated by the material within the reactor; and
summing said signals $Q_O$, $Q_M$ and $Q_L$.

9. The method of claim 8, further comprising establishing a reference signal representative of operating conditions of the reactor at the beginning of the integration period, and adding said reference signal to the sum of said signals $Q_O$, $Q_M$ and $Q_L$.

10. The method of claim 8, further comprising establishing a signal Q representative of the sum of $Q_O$, $Q_M$ and $Q_L$, differentiating said signal Q with respect to time to establish a signal $dQ/dt$ representative thereof, and terminating the reaction when said signal $dQ/dt$ falls to a preselected value.

* * * * *

UNITED STATES PATENT OFFICE

CERTIFICATE OF CORRECTION

Patent No. 3,676,653      Arens et al      Dated: July 11, 1972

It is certified that error appears in the above-identified patent and that said Letters Patent are hereby corrected as shown below:

Column 6, line 12, delete "batch" before "system";

insert -- batch -- before "reactor".

Signed and sealed this 9th day of January 1973.

(SEAL)
Attest:

EDWARD M. FLETCHER, JR.
Attesting Officer

ROBERT GOTTSCHALK
Commissioner of Patents